United States Patent
Atlee et al.

(10) Patent No.: US 7,689,444 B2
(45) Date of Patent: Mar. 30, 2010

(54) ELECTRONIC INSURANCE APPLICATION FULFILLMENT SYSTEM AND METHOD

(75) Inventors: William Atlee, Exton, PA (US); Shawn R. Carey, West Chester, PA (US)

(73) Assignee: Internet Pipeline, Inc., Exton, PA (US)

( * ) Notice: Subject to any disclaimer, the term of this patent is extended or adjusted under 35 U.S.C. 154(b) by 935 days.

(21) Appl. No.: 10/370,344

(22) Filed: Feb. 19, 2003

(65) Prior Publication Data
US 2004/0172310 A1     Sep. 2, 2004

(51) Int. Cl.
G06Q 40/00     (2006.01)
(52) U.S. Cl. .................................... 705/4; 705/2; 705/3
(58) Field of Classification Search ................. 705/2–4
See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 4,837,693 | A * | 6/1989 | Schotz | 705/4 |
| 5,655,085 | A * | 8/1997 | Ryan et al. | 705/4 |
| 5,890,129 | A * | 3/1999 | Spurgeon | 705/4 |
| 5,915,241 | A * | 6/1999 | Giannini | 705/2 |
| 6,035,276 | A * | 3/2000 | Newman et al. | 705/2 |
| 6,208,973 | B1 * | 3/2001 | Boyer et al. | 705/2 |
| 6,862,571 | B2 * | 3/2005 | Martin et al. | 705/4 |
| 2001/0034619 | A1 * | 10/2001 | Sherman | 705/4 |
| 2001/0034622 | A1 * | 10/2001 | Davis | 705/4 |
| 2001/0049611 | A1 | 12/2001 | Peach | 705/4 |
| 2002/0022976 | A1 * | 2/2002 | Hartigan | 705/4 |
| 2002/0055862 | A1 * | 5/2002 | Jinks | 705/4 |
| 2002/0107707 | A1 * | 8/2002 | Naparstek et al. | 705/3 |
| 2002/0116231 | A1 | 8/2002 | Hele et al. | 705/4 |
| 2002/0120474 | A1 * | 8/2002 | Hele et al. | 705/4 |
| 2002/0156657 | A1 | 10/2002 | de Grosz et al. | 705/4 |
| 2003/0083906 | A1 * | 5/2003 | Howell et al. | 705/4 |
| 2003/0125990 | A1 * | 7/2003 | Rudy et al. | 705/4 |
| 2003/0144887 | A1 * | 7/2003 | Debber | 705/4 |
| 2003/0216946 | A1 * | 11/2003 | Ferraro | 705/4 |

OTHER PUBLICATIONS

Downes, J. and Goodman, J., "Dictionary of Finance and Investment Terms," Barron's Financial Guides, Fifth Edition, p. 51.*
"Available for the First Time to Insurance Brokers A Comprehensive Suite of Online Tools," Oct. 1, 2001.*

(Continued)

Primary Examiner—Gerald J. O'Connor
Assistant Examiner—Lena Najarian
(74) Attorney, Agent, or Firm—Buchanan Ingersoll & Rooney PC

(57) ABSTRACT

A partially-automated system and method of generating insurance pre-applications that reduces data entry and processing errors. Rules-based software applications are used to generate insurance product options for insurance applicants. The fulfillment of each insurance application is outsourced to a service provider which reduces insurance broker involvement in the application process. A central control hub houses computer hardware and software for storing data and transmitting information between the hub and external workstations to facilitate monitoring and completion of each insurance application and placement of insurance policies. Insurance brokers may be partially or wholly reimbursed for the fee associated with each insurance pre-application.

1 Claim, 25 Drawing Sheets

OTHER PUBLICATIONS

Leyes, M. "Suite of Online Tools Now Available to Brokers," Sep. 2001, Advisor Today.*

Trembly, A. "New System Lets P-C Agents Sell Term Life," May 10, 1999, National Underwriter.*

Gaudynski, A. "SAS Insurance Technology: The Internet Has Never Been Friendlier to the Independent Agent," Aug. 2002, Wisconsin Broker: A Marketing Publication for the Insurance Professional.*

* cited by examiner

Figure 4

Apply for Coverage

Insured Information

Page 1

Instructions to Client

| Insured's Name | Company | Product | Benefit | Premium | State |
|---|---|---|---|---|---|
| Patricia Sammons | First Colony Life | Colony 15 | $50,000 | $479.00 | NC |

1. Insured's phone *

Home      213 - 222 - 1234

Business  ___ - ___ - ____

Cell      ___ - ___ - ____

Contact Preference
   ⦿ Home  ○ Business  ○ Cell  ○ All

Best Time to Call
   ⦿ Morning  ○ Afternoon  ○ Evening

Call Insured On or After  1/9/2003

2. Insured's Zip Code *   19380   (used for call center to verify time zone)

3. Will insured, end or change existing insurance *   ○ Yes  ○ No

4. Beneficiary Name(s)

First        Last        Percent

Figure 6

Apply for Coverage

Agent Report for First Colony Life    Page 3

| Insured's Name | Company | Product | Benefit | Premium | State |
|---|---|---|---|---|---|
| Patricia Sammons | First Colony Life | Colony 15 | $50,000 | $479.00 | NC |

1. General Agent's Name * — My Favorite GA

2. Agent(s) to Receive Commission — William Atlee — Commission Split * 100 %
   Agent's license # for First Colony Life : p3639     Edit
   Add Agent 3. Special instructions to insurance company (Example: Back date to save age, requesting a particular health class)
   Back date to save age 4. Special Instructions to Paramed Examiner (Example: Client afraid of needles, Schedule exam in evening, Call client at home)
   Call client at home

1 Client Information

2 Quote & Apply

Figure 7

Apply for Coverage

Order Data

Policy Information

| | |
|---|---|
| Proposed Insured's Name: | Patricia Sammons |
| Insurance Company: | First Colony Life Insurance Company |
| Product Name: | Colony 15 |
| Death Benefit: | $ 50000 |
| Date of Birth: | 1933-01-27 |
| State Application will be signed: | NC |

Proposed Insured's Information

| | |
|---|---|
| Phone: | Home: (910) 592-7758<br>Insured will be contacted at Home<br>Best time to call is in the Morning on or after<br>2002-07-16 |
| Zip Code: | 28328 |
| Beneficiary: | 1. un known (Unknown) - 100% |
| Policy Owner: | |

Agent Report

| | |
|---|---|
| Proposed Insured's Name: | Patricia Sammons |
| General Agent's Name: | |
| Agent(s) to receive commission: | 1: Gary Lardy (eq205) - 100% |
| Special Instructions to Insurance Company: | |
| Special Instructions to Paramed Examiner<br>(Example: Client afraid of needles. Schedule<br>exam in evening. Call client at home) | |

ELECTRONIC INSURANCE APPLICATION FULFILLMENT SYSTEM AND METHOD

FIELD OF THE INVENTION

The present invention relates to the field of insurance. Specifically, the present invention relates to a system and method of improving the fulfillment of insurance applications to decrease underwriting time. The method utilizes a partially-automated rule-based process to reduce data entry and processing errors.

BACKGROUND

The vast majority of insurance policies, and, in particular, life insurance policies, are obtained through an insurance agent or broker who often represents multiple insurance companies. These brokers must track an array of products and underwriting requirements related to each individual insurance company. To complicate matters, the application forms that must be completed to apply for a policy vary by insurance company, state, and product. Because most brokers may only sell a few policies each year with any one insurance company, they lack the repetition and familiarity necessary to fully understand how to properly complete each insurance company's forms. This confusion may lead to data entry and processing errors, which result in costly underwriting delays and lost sales opportunities. Because the life insurance application is the trigger mechanism that initiates underwriting processes, such as paramedical exams, motor vehicle reports and physician statements, it is critical that the application be completed correctly.

Numerous solutions have been developed to address one or more aspects of the fulfillment of life insurance applications. U.S. Published Patent Application No. 2001/0049611 to Peach claims a fully automated system for storing insurance forms and permitting consumers to directly complete electronic insurance application forms. Unfortunately, consumers know less than brokers about completing life insurance applications. Systems that rely on consumers to properly complete insurance company's forms have simply generated more mistakes and underwriting delays than previously.

U.S. Published Patent Application No. 2002/0120474 to Hele et al. claims a system for electronically obtaining an insurance application that can be completed without any broker interaction. Again, this system relies on a consumer fulfillment model, which continues to produce data entry errors and incomplete forms. Other automated systems for inputting data into an insurance application do exist in the industry. For example, U.S. Pat. No. 4,831,526 to Fuchs et al. provides a system and method of inputting client information into a database and provides contract printing capabilities. However, this method, specified for the property and casualty industry, does not reduce the data entry and processing errors made by brokers and therefore does not decrease the cost of issuing a life insurance policy.

Therefore, it would be desirable to provide a system and method which is able to reduce the errors made by brokers in the processing of insurance applications and further which alleviates the need for each broker to be familiar with the state and product specific forms for each insurance underwriter.

SUMMARY

The present invention provides a partially automated insurance application fulfillment system and method. The system and method provides a single, insurance company independent "pre-application" process and facilitates the outsourcing of the application to a service provider for the completion of the insurance application. The invention also provides for the monitoring of each application being processed through an automated control hub.

In one embodiment of the invention, personal information about an insurance applicant is gathered by a broker in a pre-application, and a rules-based application provides one or more insurance options, based on the processing of the information. Importantly, the rules-based application confirms broker licensing and commission information prior to providing any available insurance products. The broker is then able to select the applicant's chosen option, and a pre-application is created and forwarded to a control hub. The pre-application is outsourced to a service provider for the completion of the appropriate forms based on the particular insurance company chosen, the specific insurance product being purchased and the state of residence of the insured. A control hub is provided and may be utilized as a monitoring facility to allow the broker, the service provider, the insurance general agent and the insurance company to track the progress of the application process.

The present invention specifies a system and method for the insurance application process which meets the goals of reducing broker data processing errors and alleviating the need for insurance brokers to be familiar with a large number of varying insurance forms.

BRIEF DESCRIPTION OF DRAWINGS

FIG. 4 illustrates a pre-application screen.

FIG. 6 illustrates an agent report screen.

FIG. 7 illustrates an order review screen.

DETAILED DESCRIPTION OF THE PRESENT INVENTION

The system and method of the present invention provide a partially automated, broker-initiated, insurance company-independent method of completing insurance applications using rules-based applications and other supporting computer software and hardware. The method is initiated through the completion of an insurance pre-application form and the monitoring of the insurance application fulfillment process.

Pre-Application Process

Figure 1:
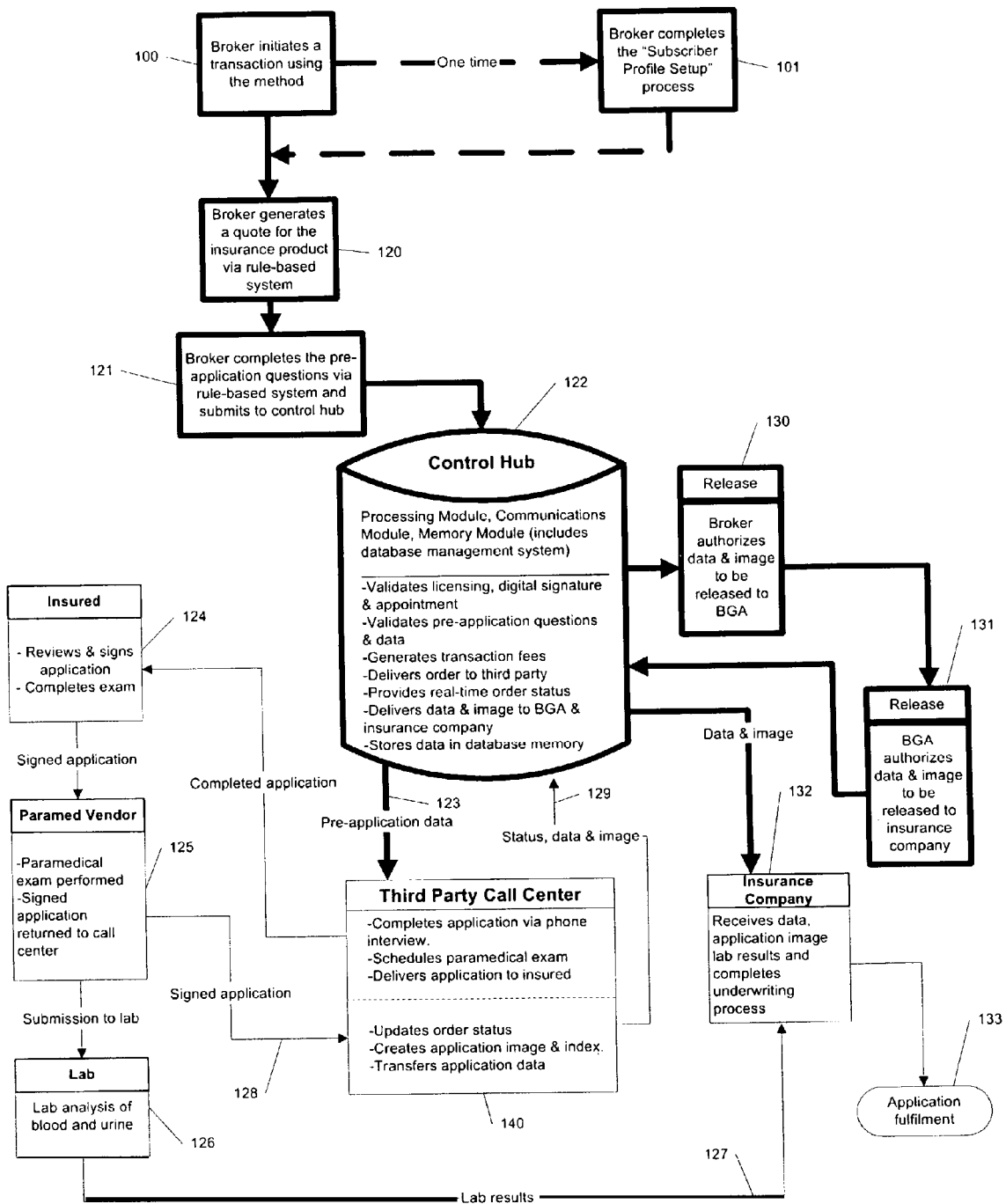
FIG. 1 illustrates a flow diagram of the entire standard process of the present invention.

FIG. 1 illustrates one embodiment of the method in broad, exemplary terms. The broker must first be registered with and a subscriber to the system and method. If the broker tries to initiate a transaction using the system and method 100, and has not yet subscribed, the broker will have to complete a Subscriber Profile Setup 101. The broker is then able to generate insurance quotes for a client 120 and complete an insurance pre-application 121.

Figure 2:
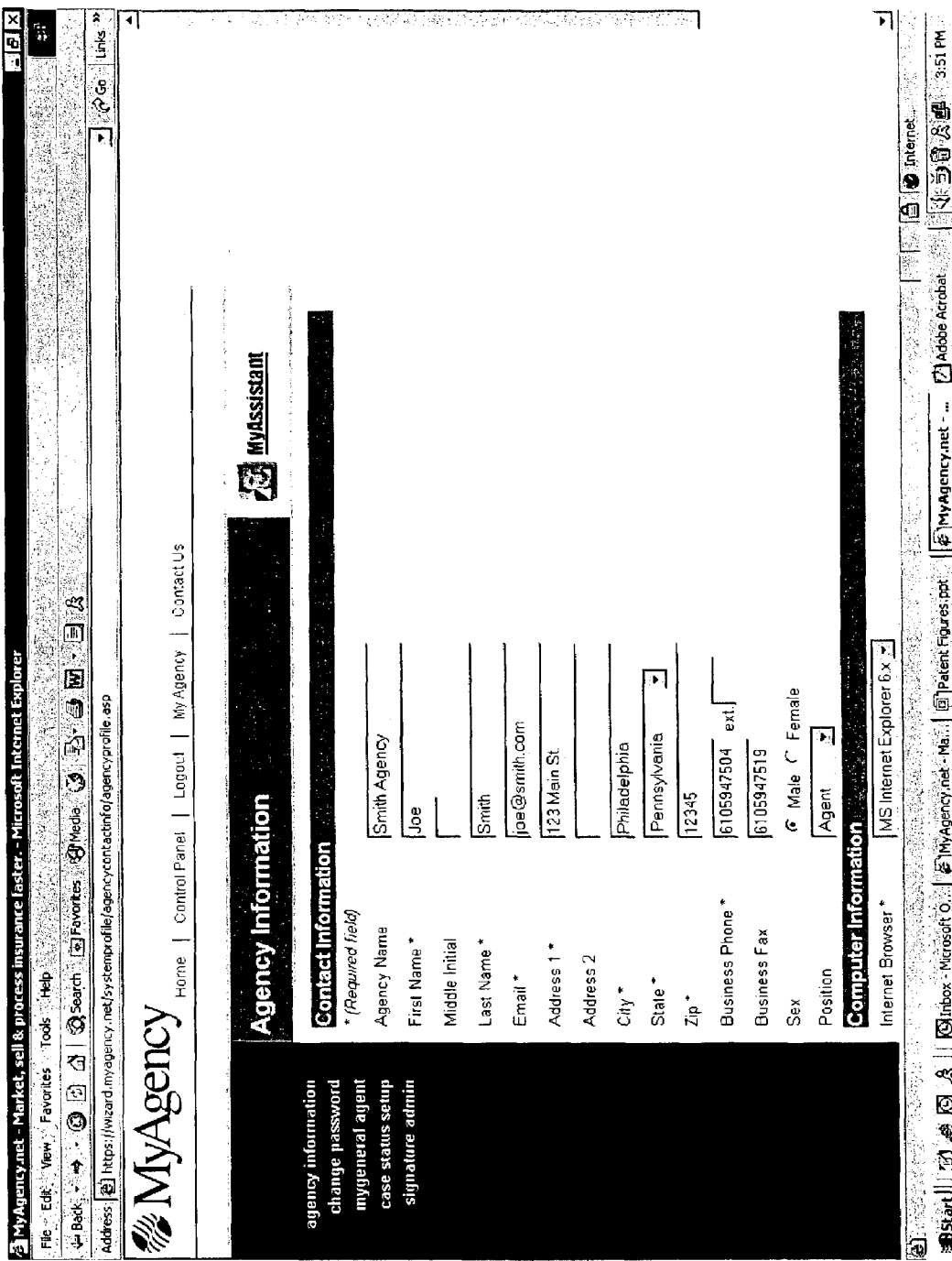
FIG. 2 illustrates the broker profile set-up process.
Figure 2A:
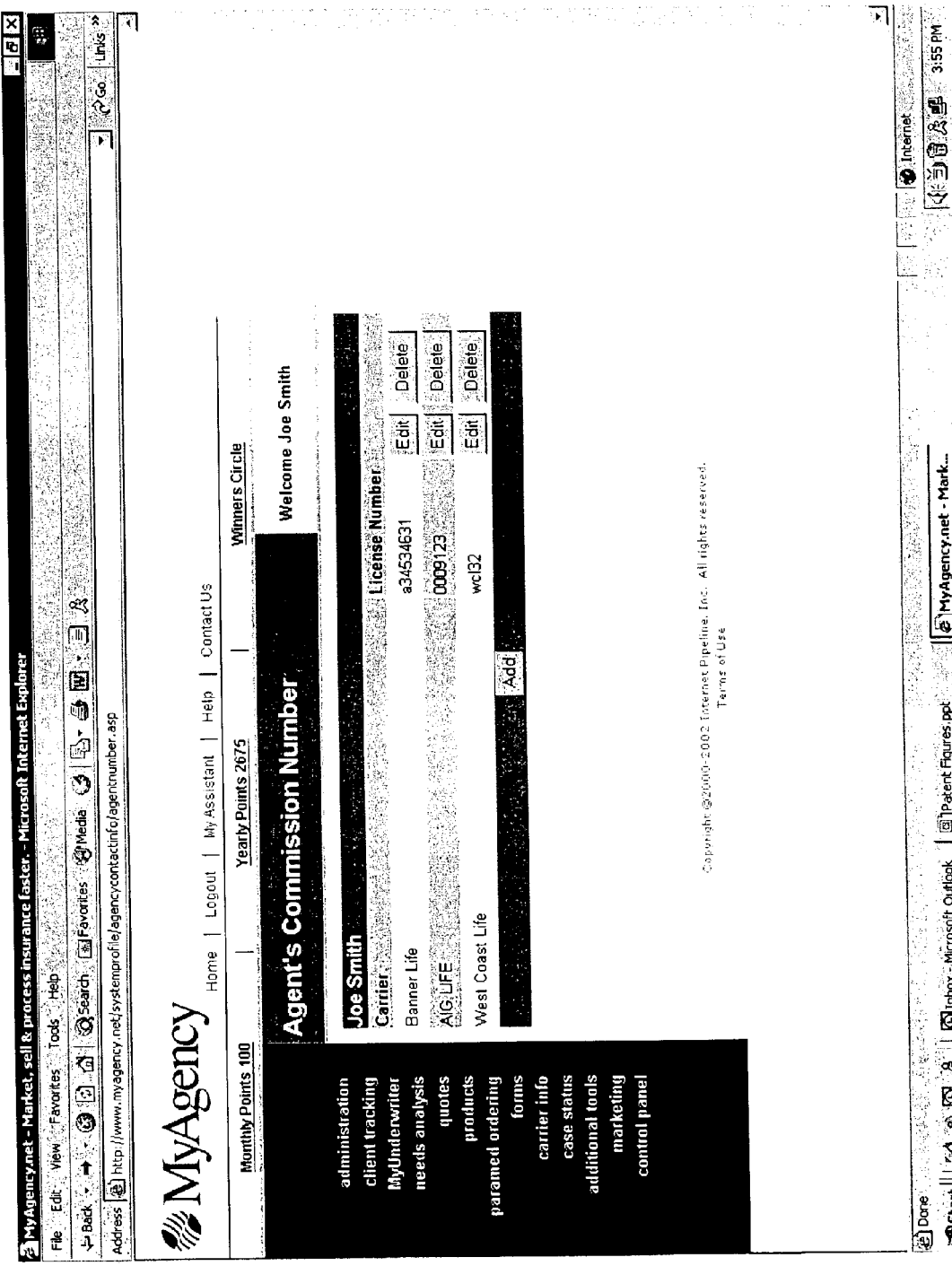
FIG. 2a illustrates the broker license and commission set-up screen.
Figure 2B:
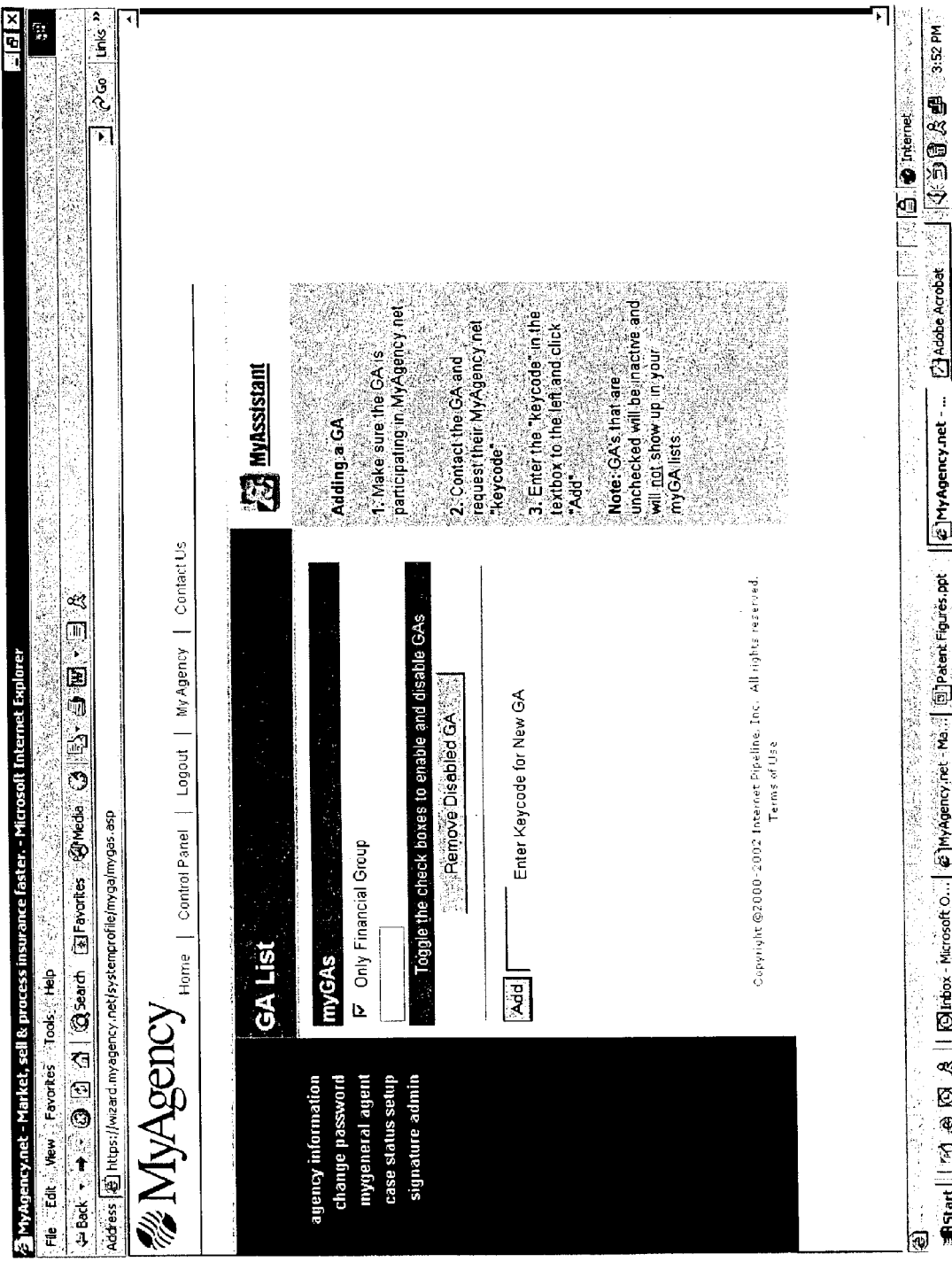
FIG. 2b illustrates the insurance General agent set-up process.
Figure 2C:
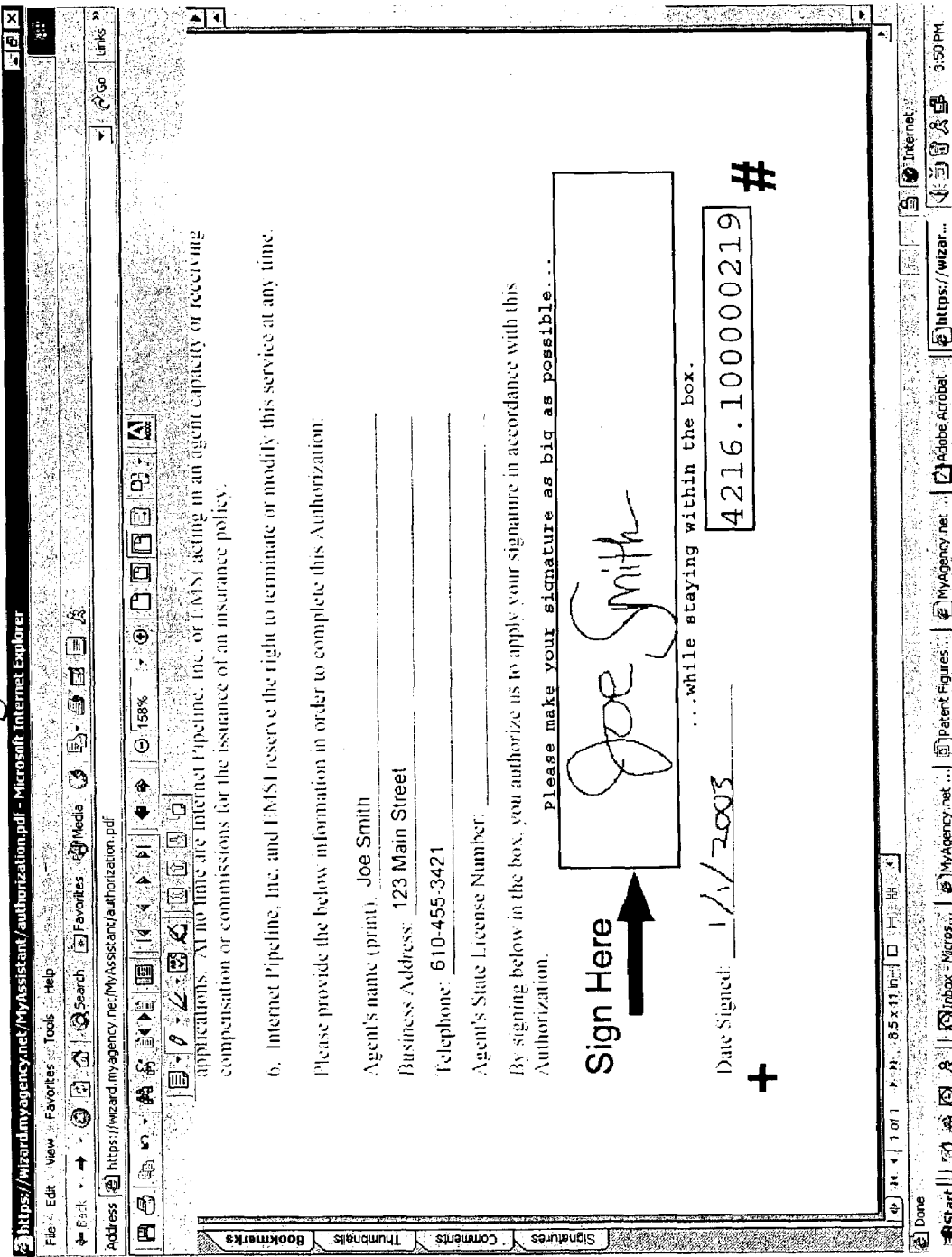
FIG. 2c illustrates the digital signature set-up process.

FIG. 2 illustrates registration information collected from the broker at a remote work station. To register, the broker also provides certain licensing and appointment information. Preferably, the broker provides licensing, appointment, commission tracking numbers and selects one or more General Agent(s) (also referred to as Broker General Agent, or "BGA") as illustrated on FIGS. 2a and 2b. This broker registration process generates a broker subscriber profile. The broker subscriber profile is stored within a database management system ("DBMS"). The broker may also be required to submit a handwritten signature, as illustrated on FIG. 2c, to an image collection and processing system for later use as a digital copy of the broker's signature in completing applications. This image of the broker's signature is also stored within the broker's subscriber profile. The image of the broker's signature is electronically inserted, where required, onto the insurance company's application forms. This insertion occurs upon completion of each applicant's application and prior to the submission of the application to the providing insurance company.

Figure 11:
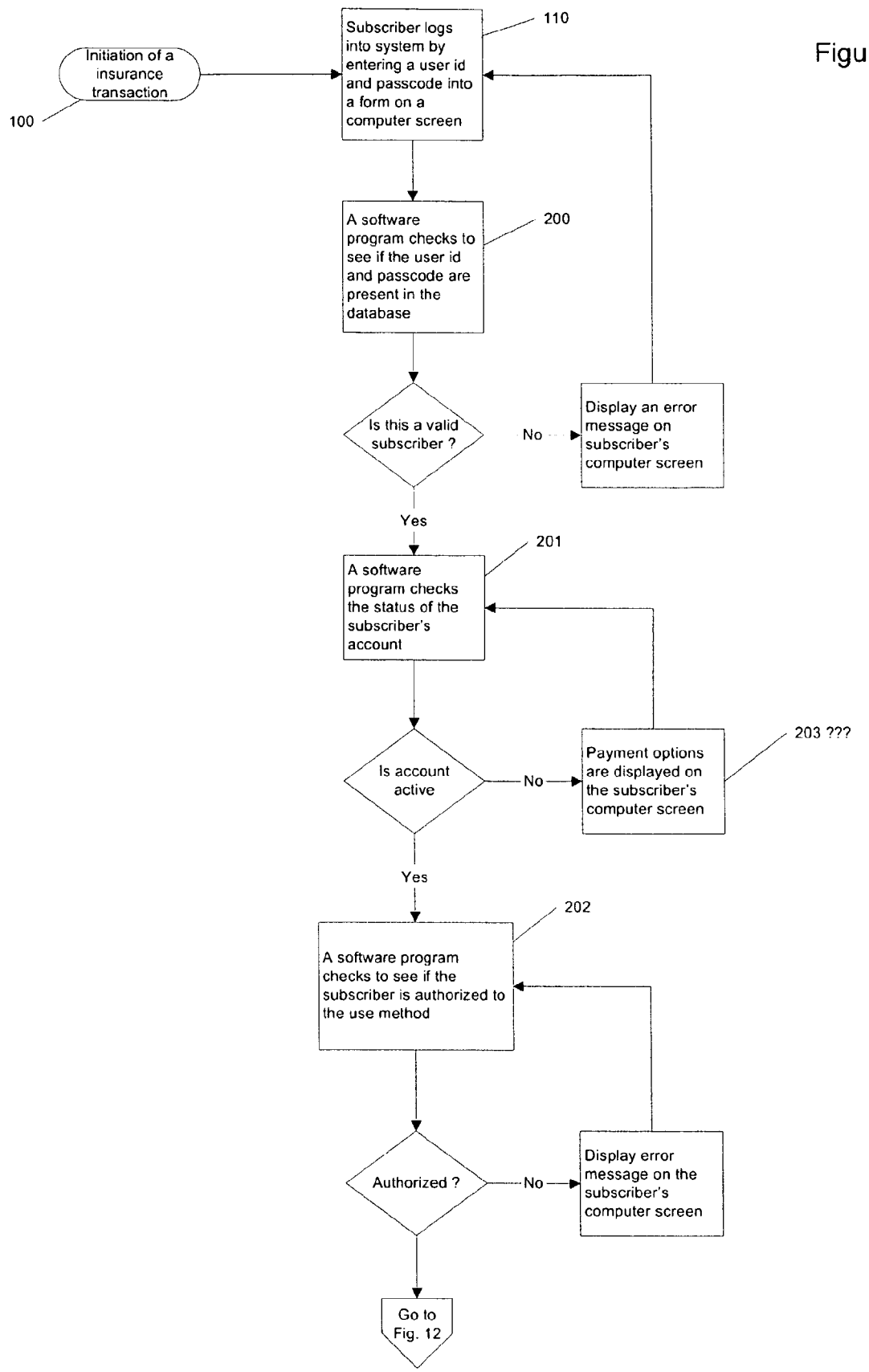
FIGS. 11-16, 18-19 provide a running flow diagram of one embodiment of the system and method.

Referring to FIG. 11, once the broker has registered, the broker is able to initiate an insurance transaction 100 by logging on to the system and entering an identification code and pass code 110. Software of the system of the present invention provides a check on brokers and other parties logging onto the system for valid user ID and pass code 200, subscriber account status 201, and authorization to use the method 202. Continuing onto FIG. 12, if the system recognizes a valid user ID and pass code, the system also verifies the existence of a broker subscriber profile and digital image of the broker's signature in memory in the database 203.

Figure 12:
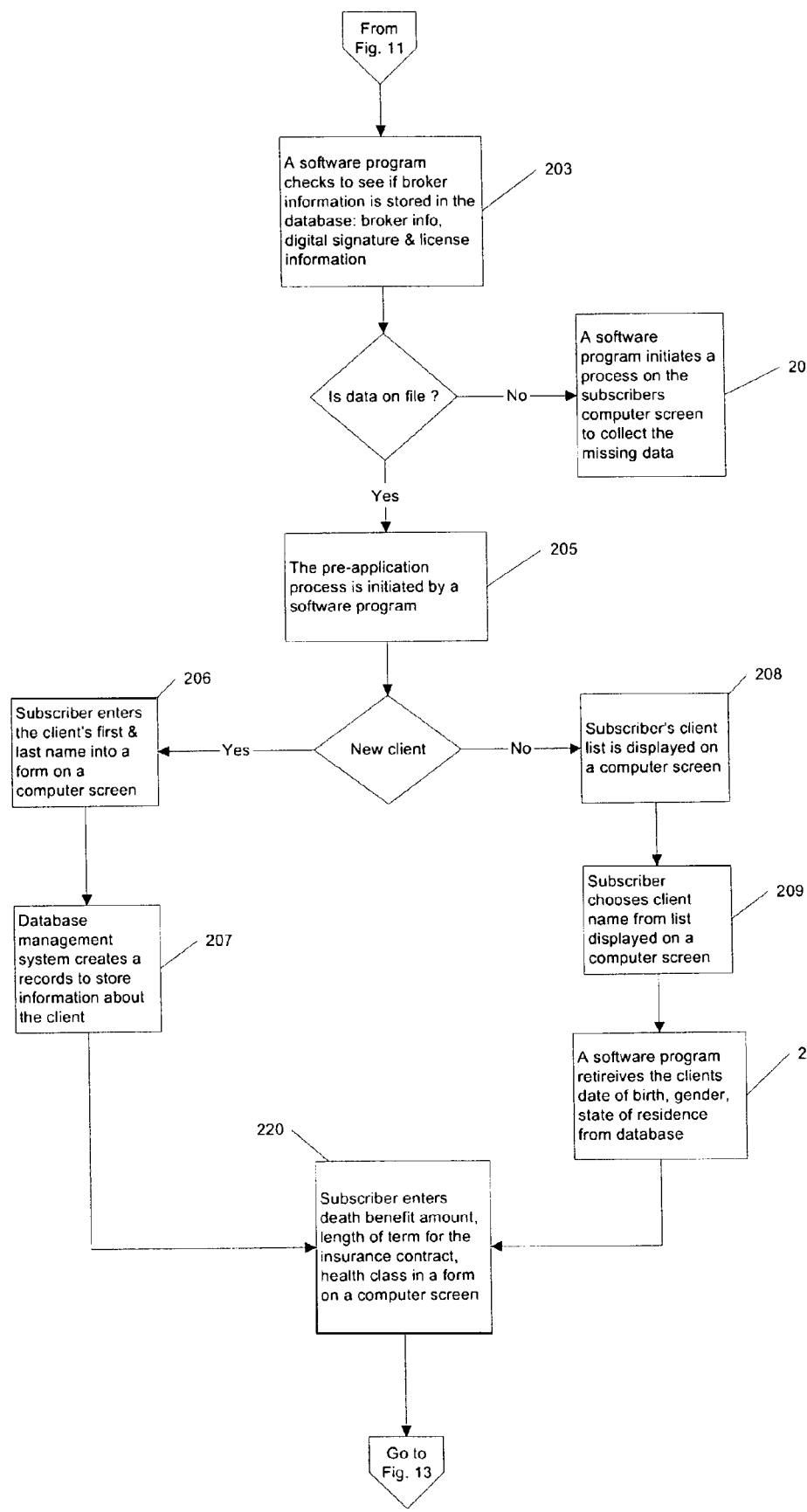

Referring to FIG. 12, if certain of the broker's subscriber profile information and/or signature have not been collected, the system initiates the process to collect that missing information 204. Otherwise, the broker may now use the system and method to initiate an insurance pre-application 205.

Figure 3:
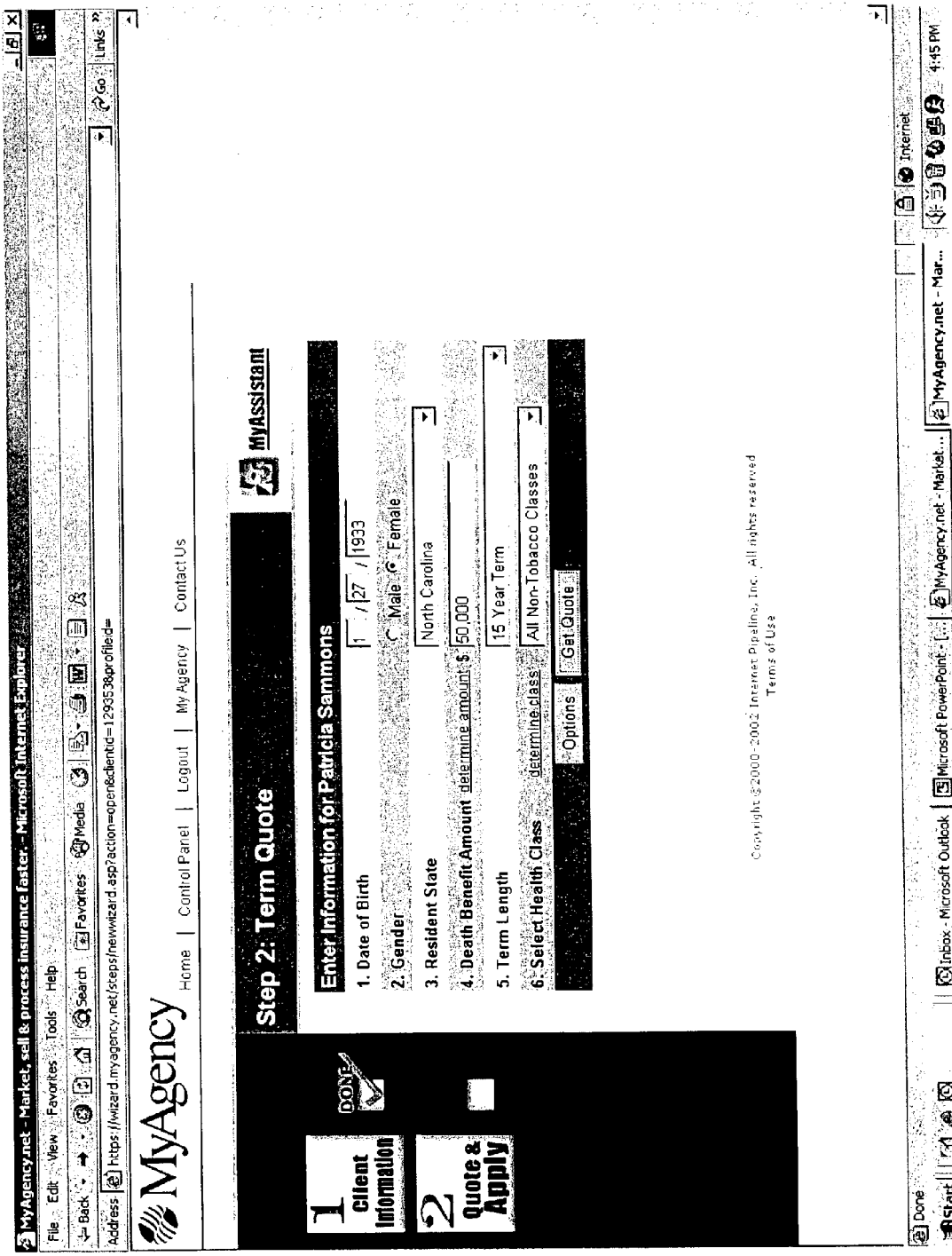
FIG. 3 illustrates a client profile quote engine input screen.

Brokers are contacted by, or contact applicants (also referred to as "clients") that wish to obtain insurance. The client's personal information is entered into a personal quote profile form using an on-line interface 220, shown on FIGS. 3 and 12. The client's personal data may include, but is not limited to: the client's date of birth, benefit amount, tobacco use, health class estimate, the resident state, term length and gender. Different criteria may be used, depending upon the type of insurance desired. The client's health class is preferably classified as preferred plus, preferred, standard, preferred tobacco user, or tobacco user, and/or any other health classification system used by life insurance companies or underwriters. Referring once again to FIG. 12, if the client is a new client, the broker enters the client's first and last name into the system 206, and the information is stored in a new record in the system database 207. If the client is an existing client, the broker pulls the client's information from the system 210 based on the client's name 209 that is on the broker's client list 208. Alternatively, a subscribing broker may request that a third party, also a subscriber to the present system and method, initiate the method at the pre-application stage 205. According to this embodiment of the present invention, the broker faxes the client's personal information to the third party for entry into the system.

Figure 3A:
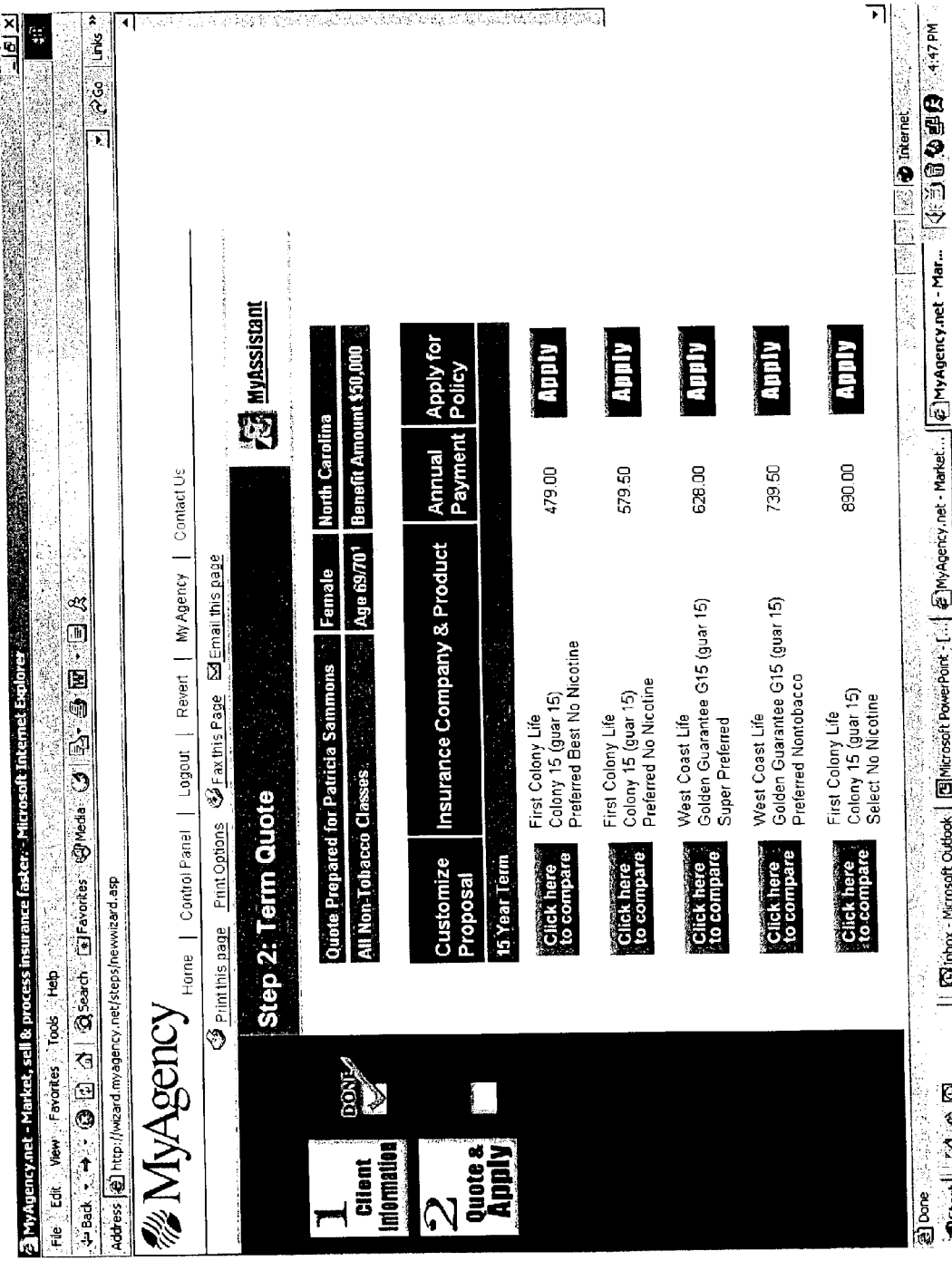
FIG. 3a illustrates an example quote output screen.
Figure 13:
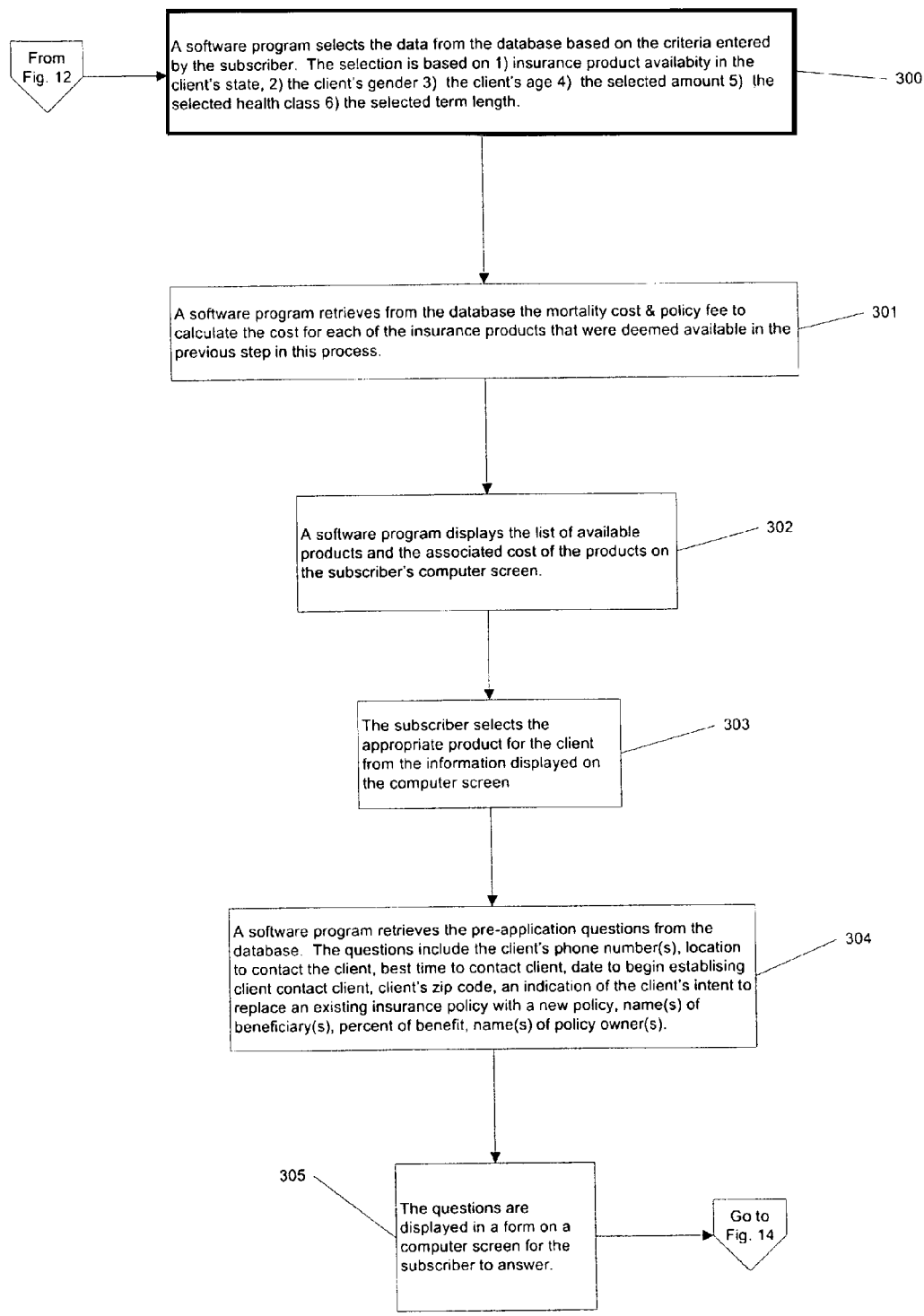

Referring now to FIG. 13, the client's personal quote profile is fed into a rules-based system, where it is matched against the offerings of a plurality of insurance companies, based on the desired insurance product and the availability of that product from each insurance company in the applicant's state of residence 300. A software program, as part of the rules-based system, retrieves 301 and displays 302 a list of insurance products that fit the client's profile. The rules-based system relies on a database within the system that houses insurance company profiles and product information using mortality tables, state approvals, policy fees and health class criteria. Upon confirmation, the system displays 302, as shown in FIG. 3a, the proper quote (also known as premium amount) based on the client's profile for each insurance company offering the appropriate product. Next to each quote is an "apply button". As shown on FIG. 13, by selecting an insurance product for the client 303, the apply button launches the broker into the pre-application process 304 whereby pre-application questions are displayed on the broker's or other subscribing users screen 305.

Figure 18:
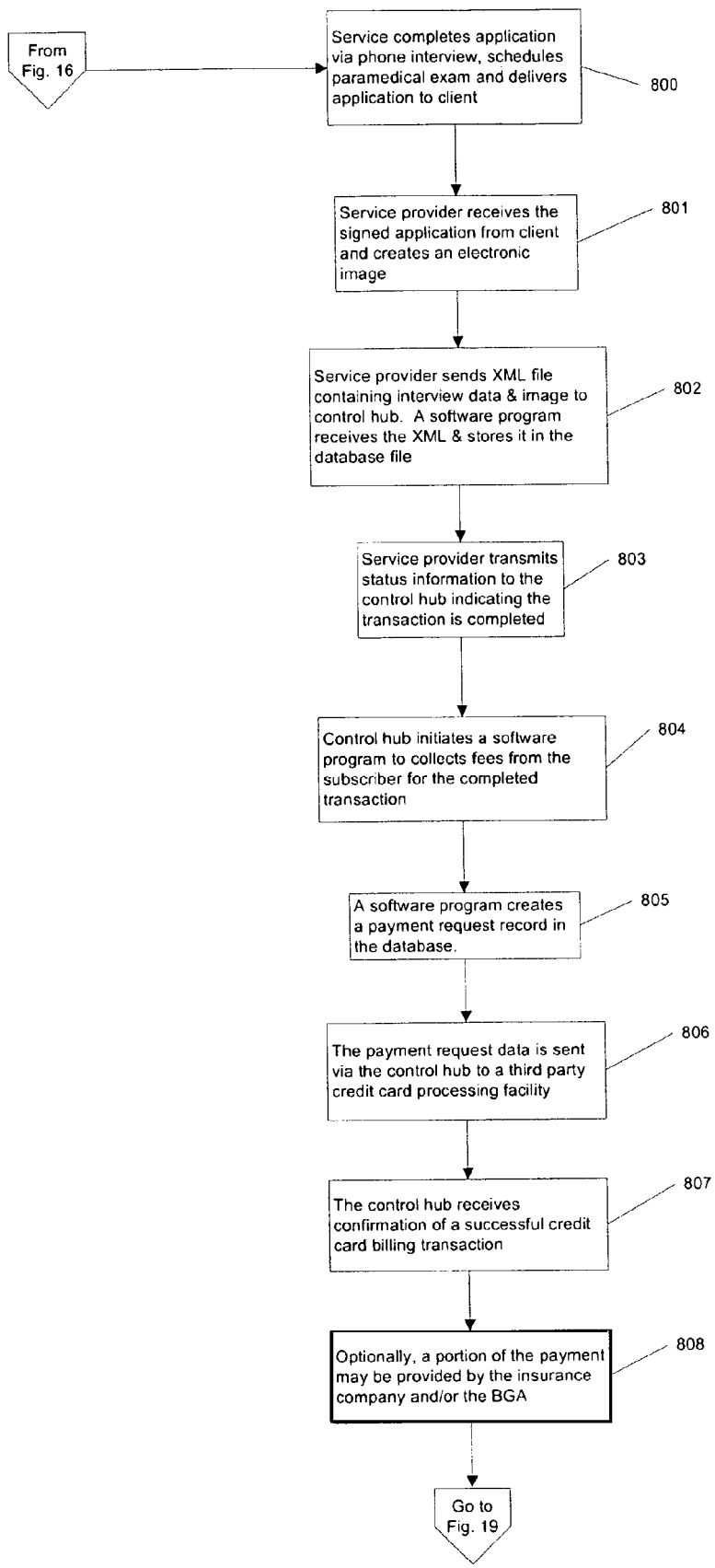

The service implemented by the system and method may be offered to brokers on a subscription basis or may be charged for on a per-application basis. FIG. 11 illustrates that for an active broker account, the broker has provided for a method of paying the subscription fee or transaction fee 203. Referring briefly to FIG. 18, as will be discussed later in more detail, the method of paying the fee facilitates payment once a payment request 805 is generated by the system. A payment request 805 is not generated until the system receives a status update 803 indicating that a complete insurance application has been signed by the client 801, an electronic image of the application has been made 801, and the data and image have been stored in the system database file 802. Registered brokers are reimbursed all or a portion of each subscription fee or pre-application transaction fee by the insurance company and/or the brokers' General agent(s) involved in the application process 807. Preferably, brokers are only reimbursed when an insurance policy initiated by the present method is placed in force. According to another embodiment, an insurance company or General agent pays the subscription and/or pre-application transaction fee up front and the broker is not billed.

Figure 5:
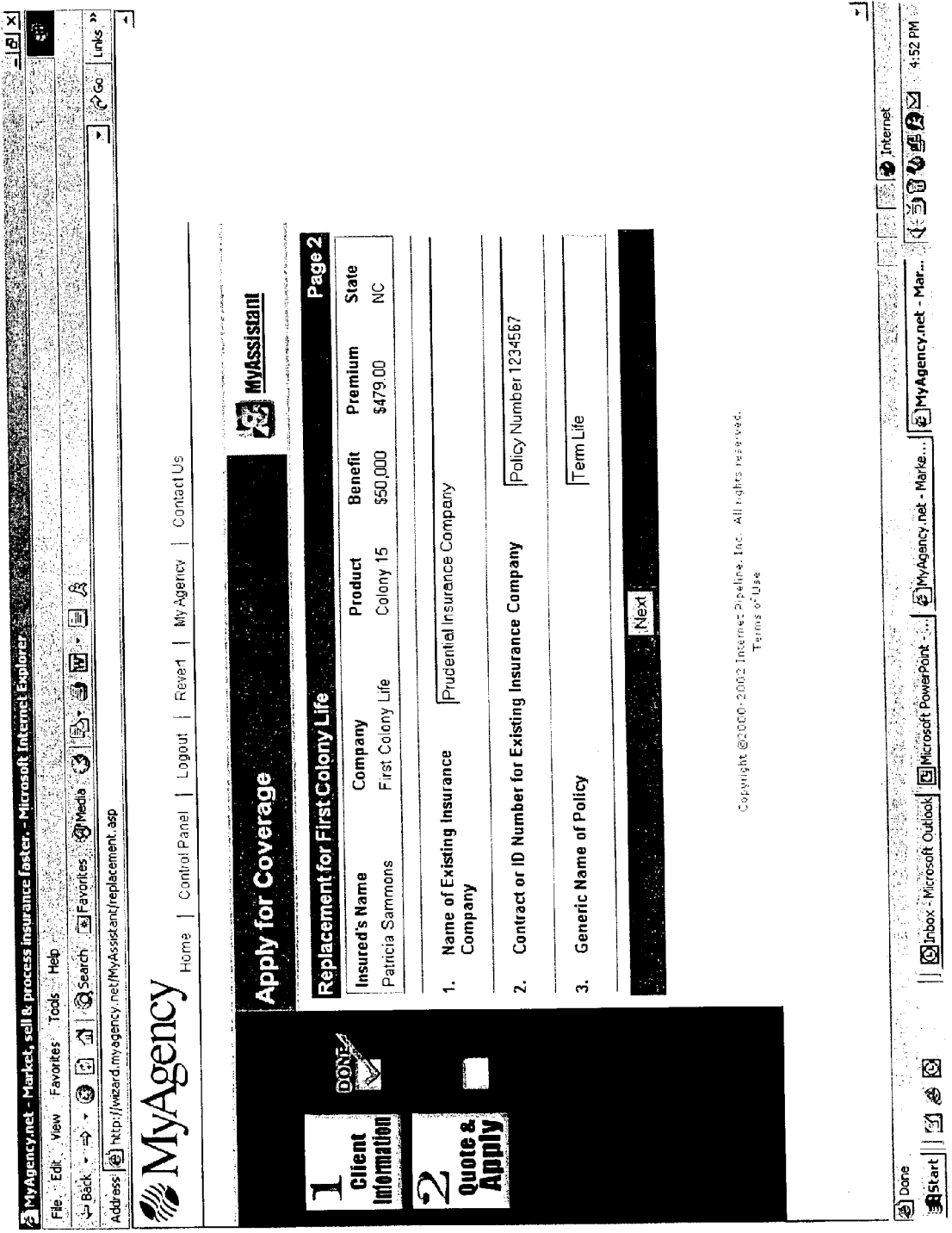
FIG. 5 illustrates a replacement questions screen.
Figure 14:
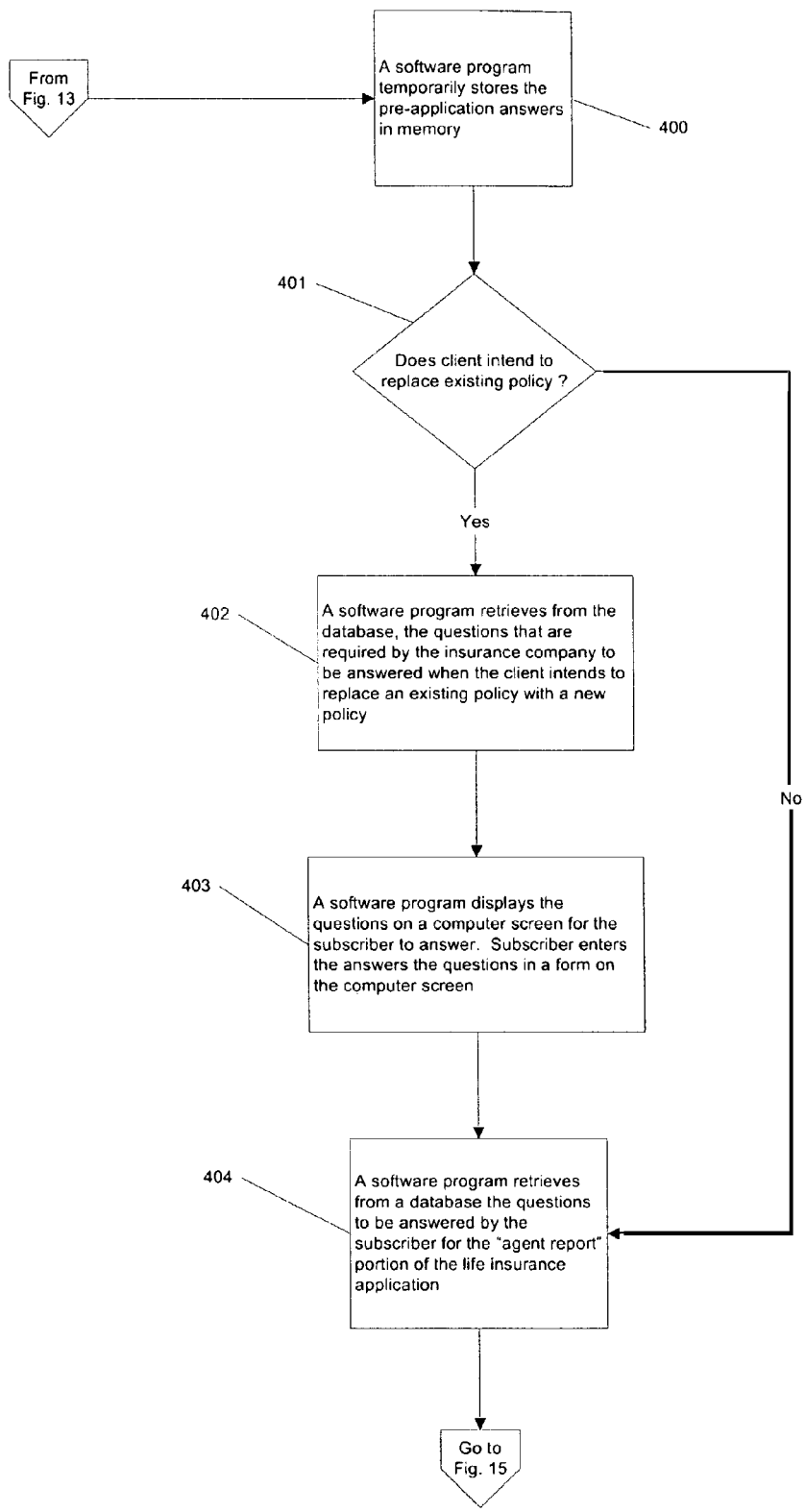

Shown on FIG. 13, the method of the present invention provides the broker with a single point of entry 305 for the initiation of the pre-application. FIG. 4 illustrates an example of this single point of entry known as a pre-application screen. Referring again to FIG. 13, the pre-application screen automatically selects the quote profile results and transfers it onto the pre-application form 304. The broker then enters their client's contact information into the on-line pre-application form 304, 305. Referring to FIG. 14, the client's information is stored in the system database 400. This information includes, for example, phone numbers, contact preference, resident time zone, replacement questions, and owner and beneficiary designations. If the applicant has decided to replace an existing policy 401, software, as part of the underlying system, dynamically retrieves 402 and displays 403 the insurance company's State specific replacement questions in the pre-application form. These replacement questions are stored in the database and only appear to the broker if the replacement question, located on the pre-application (see FIG. 4), is answered, "yes". FIG. 5 illustrates a sample replacement question screen.

Figure 15:
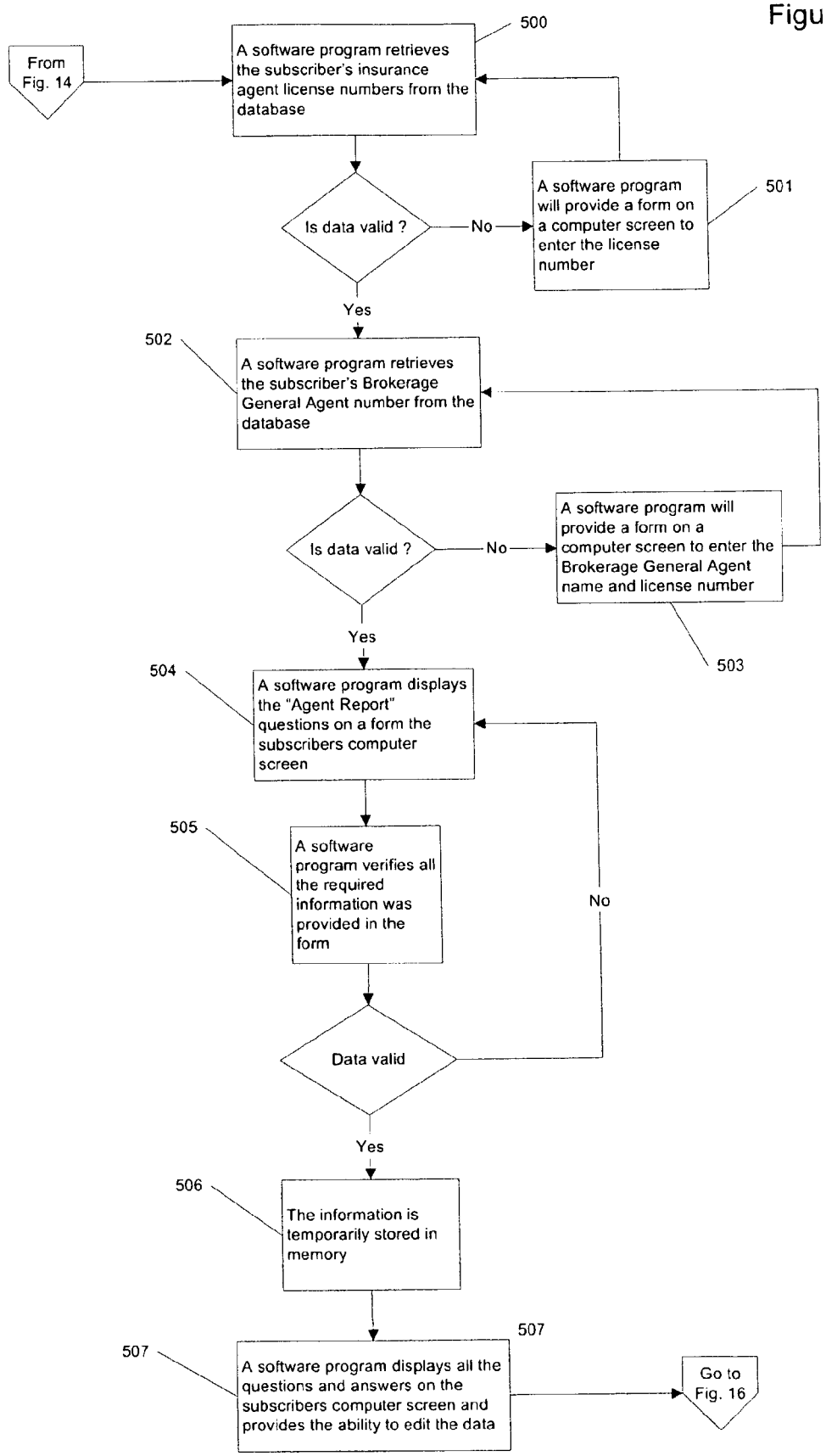

Referring to FIGS. 14 and 15, after entry of this information, a broker is directed to an insurance company specific agent report 404 where the broker is required to record a valid license number 500, 501 to designate a licensed insurance General agent 502, 503, and complete a brief agent questionnaire 504. This report is completed and confirmed by the broker using an agent report screen, as illustrated on FIG. 6. Returning to FIG. 15, upon validation of the broker's licensing and other information 505, the information is stored in the system database 506, and the broker is directed to a pre-application order screen(as shown in FIG. 7). The broker may then review the pre-application, edit the information if necessary 507, and, upon satisfaction, submit the order to a service provider for fulfillment of the insurance application 600 (as shown on FIG. 16.).

Figure 8:
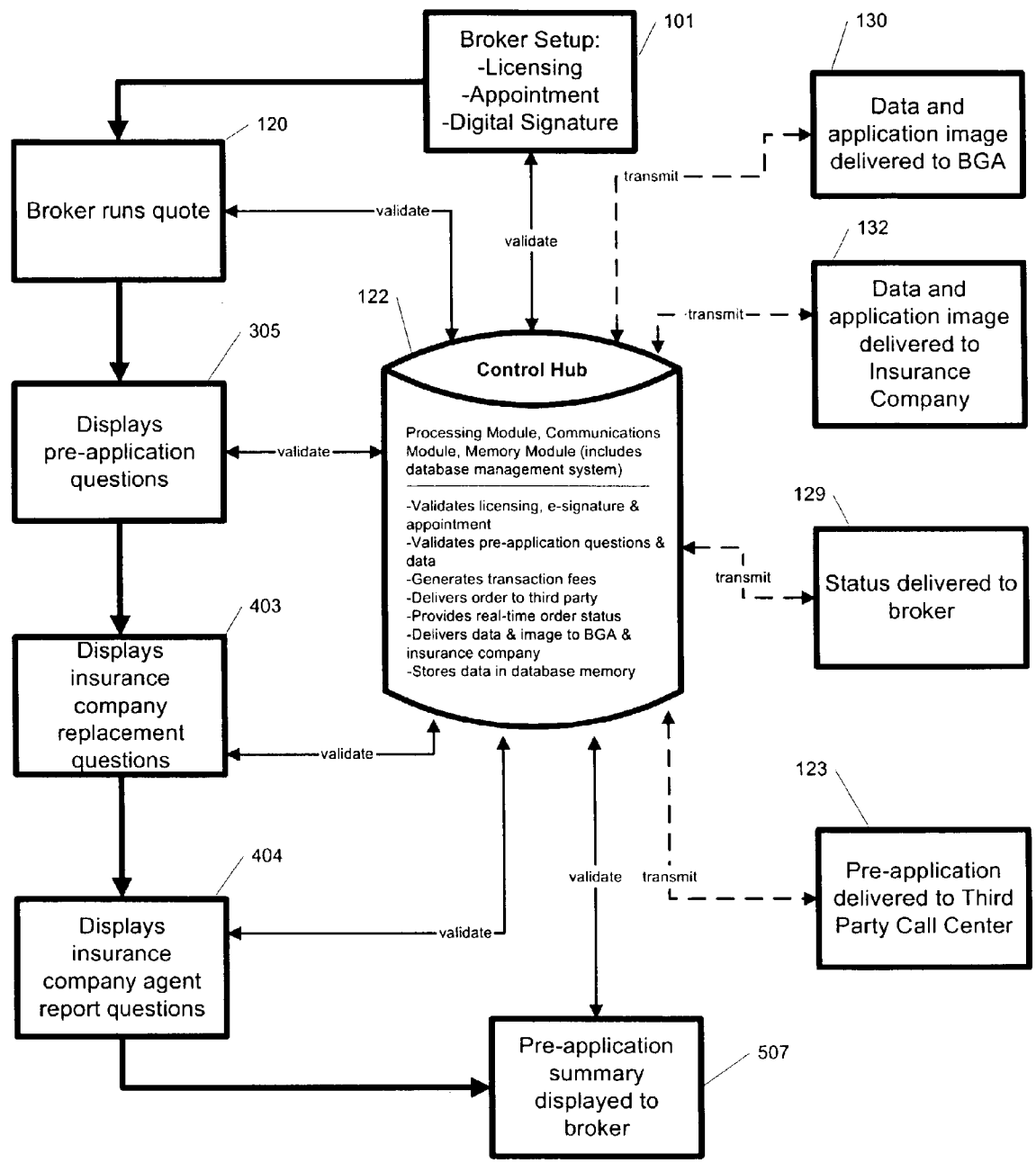
FIG. 8 provides a diagram of the control hub.
Figure 16:
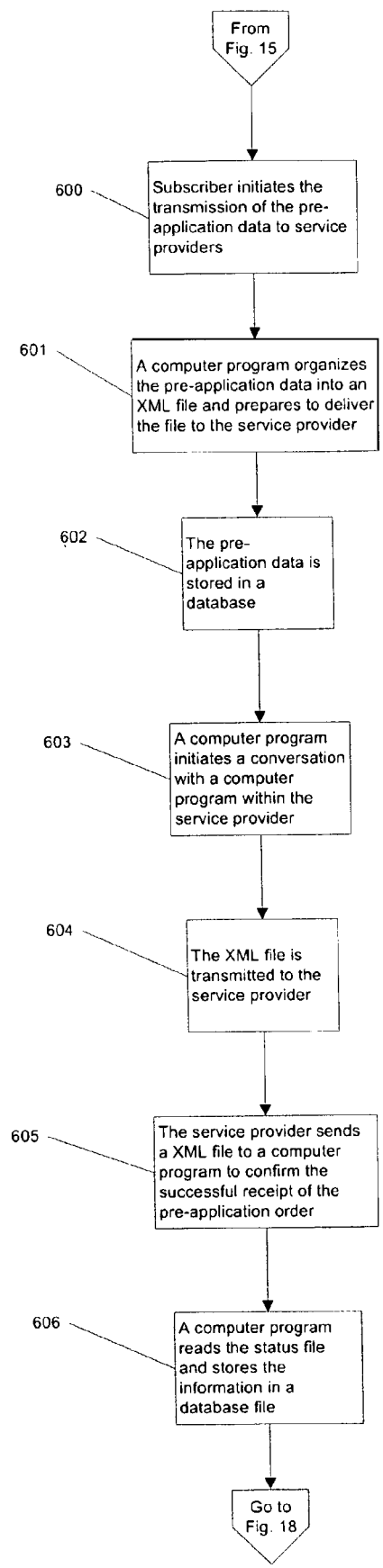

Referring to FIG. 16, upon submission by the broker 600, according to the preferred embodiment, the pre-application order is converted into XML format 601, the information stored in the system database 602, encrypted, and securely passed through the "control hub" through communication, via system software, with the service provider's external software 603, 604. FIG. 8 provides a schematic of the control hub. The control hub automatically stores a record of the transaction in the system database 606 and, according to one embodiment of the present invention, may optionally generate a transaction fee which is charged to a subscribing party, and preferably charged directly to the broker's credit card 806, as illustrated on FIG. 18. Alternatively, the broker's insurance General agent or the participating insurance company may be billed directly.

Figure 9:
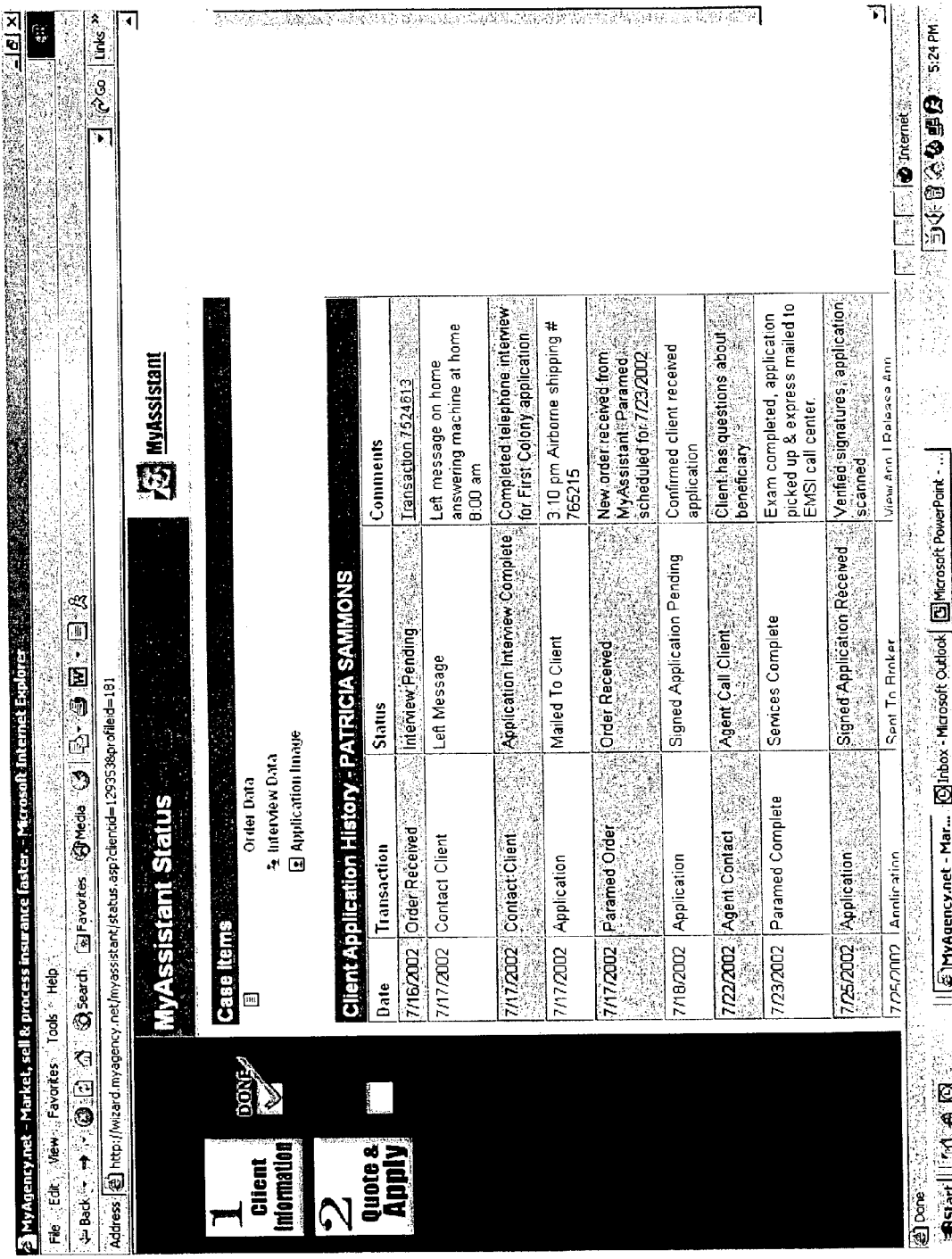
FIG. 9 illustrates a status screen.

Preferably, the application for insurance is completed by a service provider. However, the status of each application is monitored via the control hub that receives and transmits status updates, notifications, and other information to and from the various parties using the system and method. Referring to FIG. 9, an example of a status screen is shown, providing the dates of each application transaction, the status of the application at that point, and any comments the status provider wishes to input. A broker can log into the system, as shown on FIG. 11, preferably using a secure pass code 110, and determine a plethora of information regarding the processing of the application, such as, for example, when the pre-application XML order was received by a service provider, when the applicant was initially contacted the date the application interview was completed, the express mail tracking number of the signed application mailed back to the service provider, the paramedical examination completion date, when the application was signed by the applicant and the date the image and data where transmitted back to the broker for final review. As illustrated on FIG. 17, XML files containing status information are transmitted between service providers, brokers, and other third parties and the control hub 700. The computer-based control hub acts like a "traffic cop" to manage and direct the flow of data to and from all parties involved in the application transaction using a series of computer systems, databases, and communication protocols to actively interchange data. The end result is a single source of information for up-to-the-minute status of a pre-application order. The pre-application process, supported by the control hub, is easily used by one with ordinary skill in the use of a computer.

Figure 17:
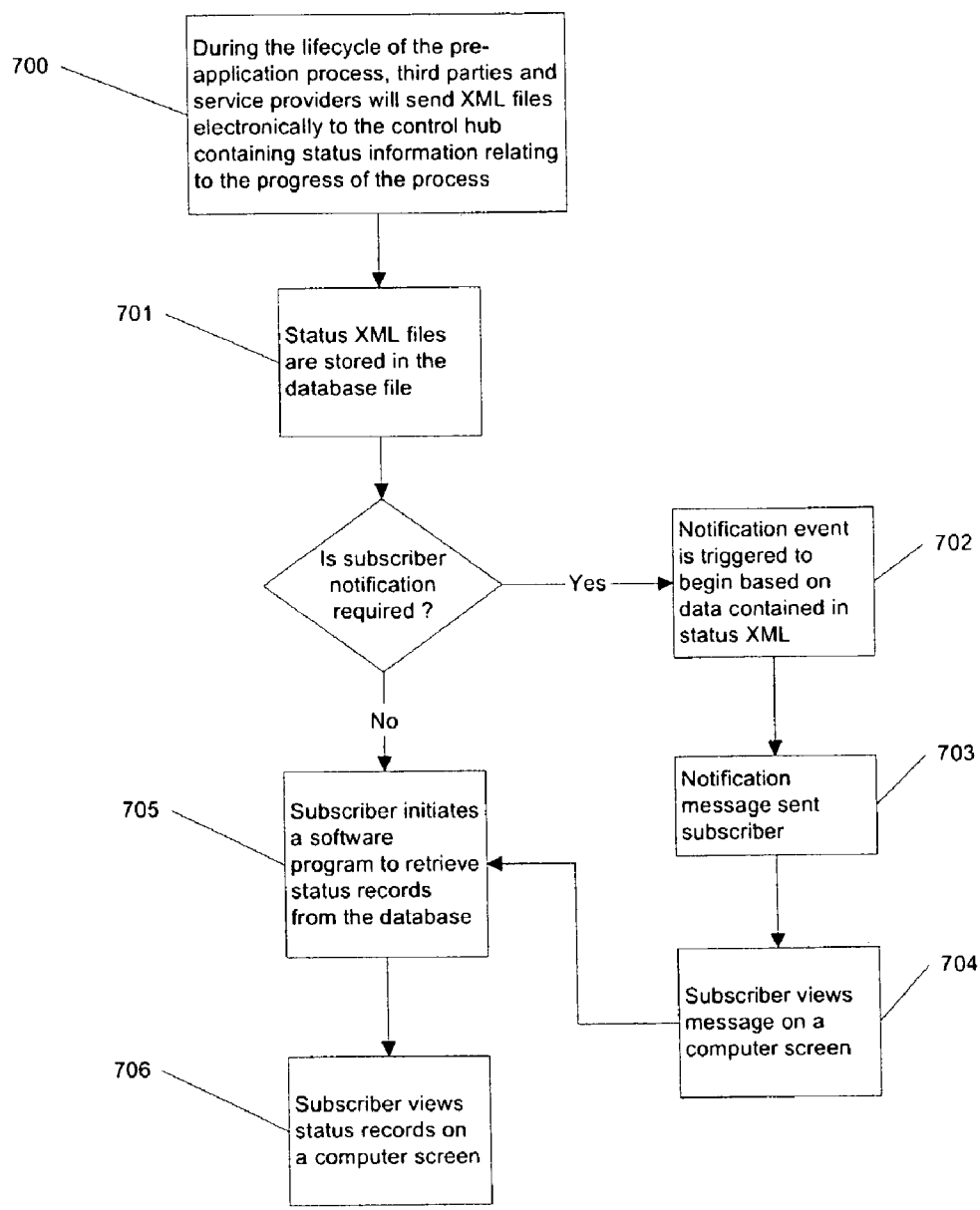
FIG. 17 illustrates information transfer and application status capabilities according to one embodiment of the system and method.

The XML files are stored in a database 701, as shown on FIG. 17. Certain status XML files may trigger notification of the subscriber or broker that initiated the pre-application process 702. The system includes software that is programmed to send electronic messages 703, 704 to the subscriber based on changes to data in XML files sent to the control hub that affect the client's insurance application. These electronic messages that may be spawned throughout the application process based on changes in client data and information may require attention by the subscribing party before the application process can proceed. By way of example, if an applicant changes an insurance beneficiary during a third party interview, that changed information will generate a message to the broker via the communications interface, notifying the broker of the change. Thereafter, the broker may counsel the applicant on the beneficiary change before proceeding with the insurance application. At any time during the process, a subscriber can retrieve 705 and view 706 status records.

Referring to FIG. 18, a service provider completes the application process by obtaining the remaining information required for the insurance application from various parties. The service provider may be associated with the broker, or may be a contractor, or any other third party. The service provider is preferably familiar with the forms required for insurance applications, and is knowledgeable in the completion of the correct insurance forms with the appropriate data. More preferably, the service provider is a call center that specializes in paramedic services. The service provider is responsible for contacting the applicant, based on the applicant's preferred contact criteria as specified in the pre-application, and collecting the information required to complete the application 800. The service provider may optionally reach out to other parties for data and information necessary to complete insurance policy applications according to the present system and method. FIG. 1 illustrates the use of a call center 140 to fulfill the application, and various other parties that the call center 140 may utilize in the process, for example, paramedic vendors 125, laboratories for analysis of medical testing 126, financial institutions, etc.

Referring again to FIG. 18, once the service provider receives the signed application back from the applicant 801, the method stores an imaged copy of the application along with a copy of the answers (which were converted into XML data and again stored by the control hub for future access) 802 given by the applicant during the interview by the service provider. Status information is also transmitted to the control hub 803. Importantly, the system and method also provide for reimbursement to the broker (or other subscribing user that initiates a transaction) for part or all of the transaction/subscription fee. Once the system receives notice that application has been completed 803, a software program is initiated 804 which generates a payment request 805, which is typically sent directly to the broker's/subscriber's credit card processing facility 806. Once the payment confirmation is received 807, the accounts receivable database is updated 900 (as shown on FIG. 19). Preferably, the all or a portion of the payment is reimbursed by the insurance General agent or insurance company approving the insurance application 808.

Figure 9A:
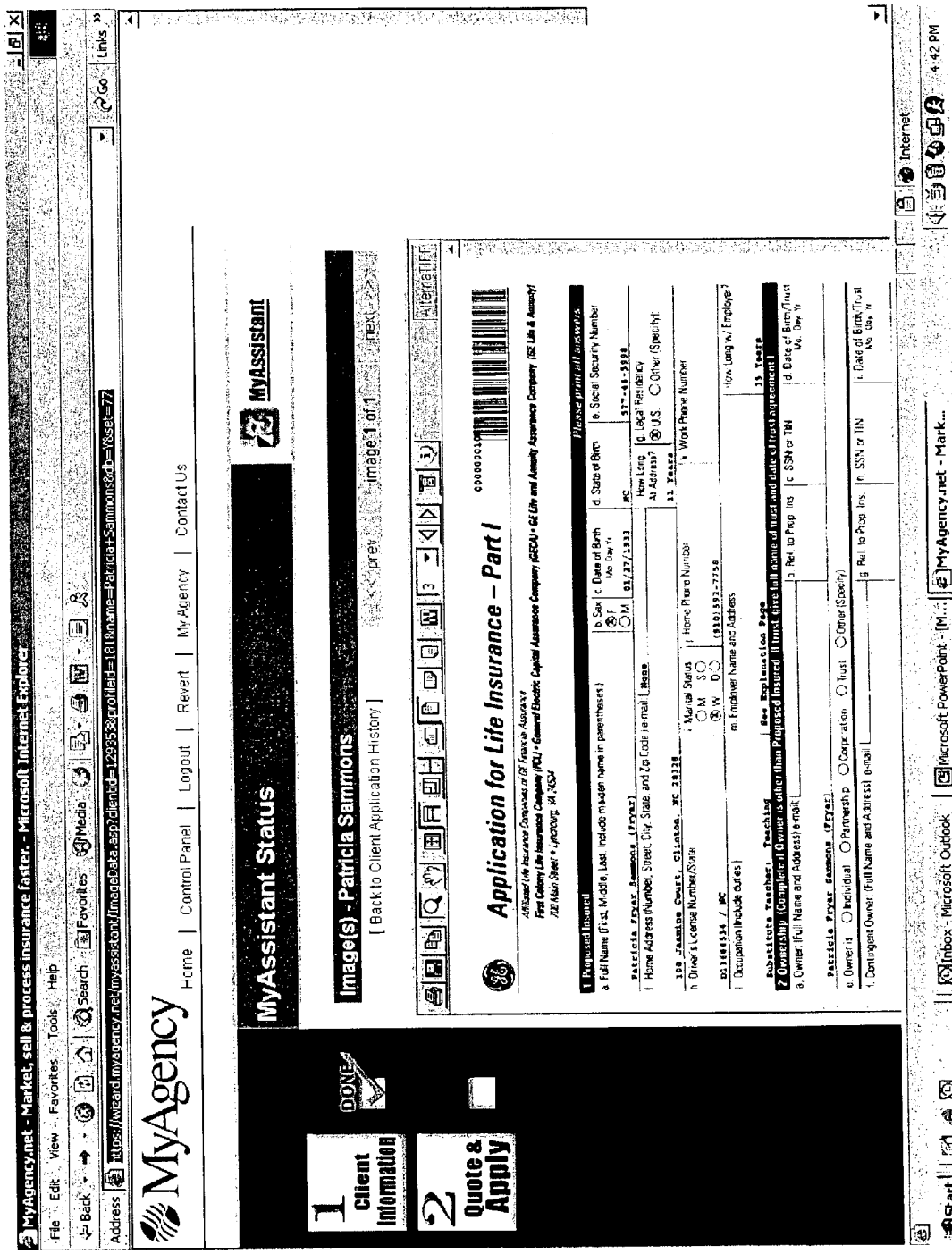
FIG. 9a illustrates an application image screen.
Figure 9B:
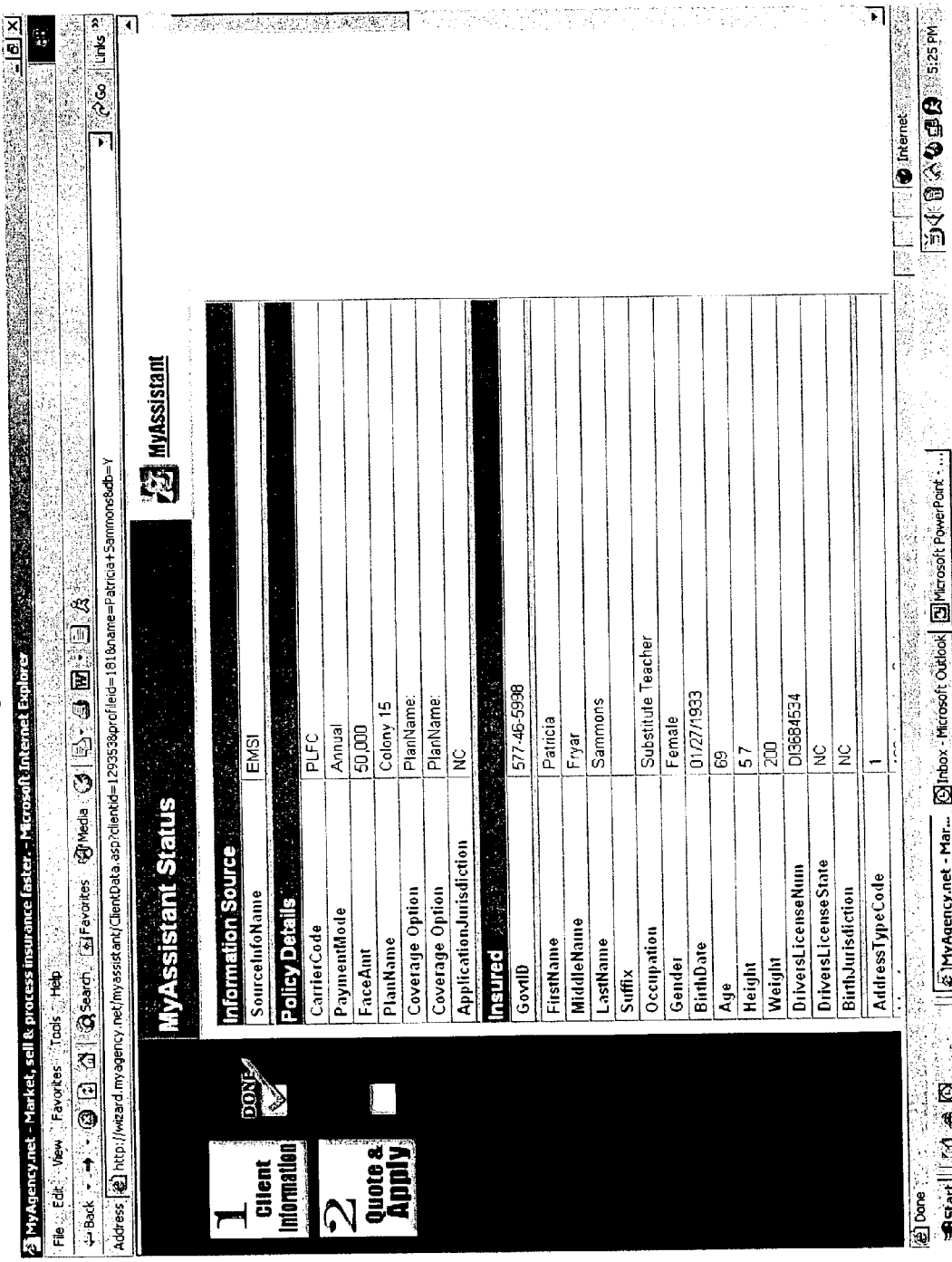
FIG. 9b illustrates data collection during a tele-interview.

Referring to FIG. 1, once the service provider has completed the fulfillment of the insurance company's state application and has obtained the proper applicant signatures 128, the broker can access the control hub to electronically view the collected applicant data, and an imaged copy of all forms that were completed, signed by the applicant 124, optionally collected by a paramedical vendor 125, and returned by the applicant to the service provider 128, and subsequently uploaded into the control hub 129. An example of a complete imaged application as provided by the control hub is available as FIG. 9a and the answers provided by the applicant during the interview by the service provider are also available for review, as shown on FIG. 9b.

Figure 10:
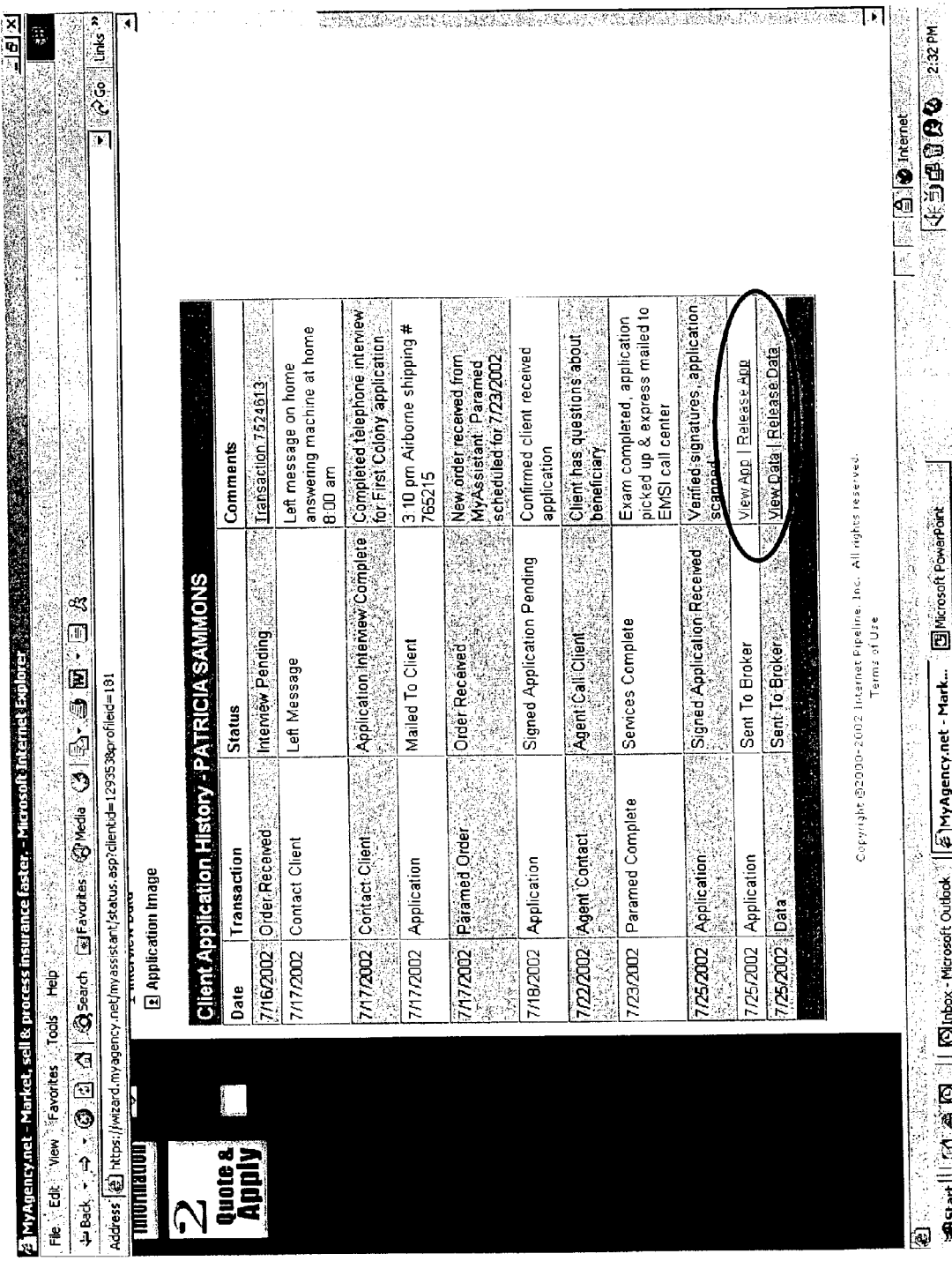
FIG. 10 illustrates a pre-application release screen.
Figure 19:
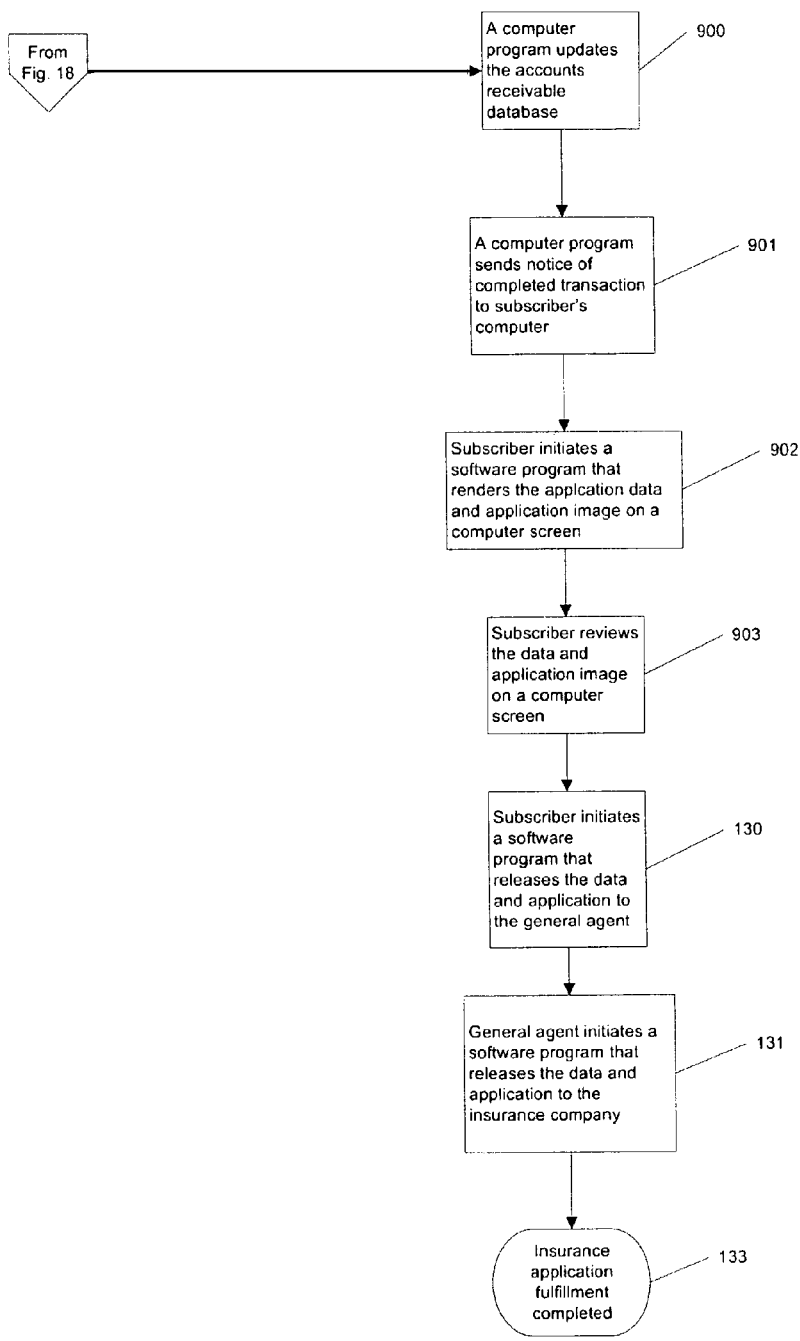

Referring to FIG. 19, the broker electronically receives notice of a completed transaction 901. The broker may then access 902 the application image (FIG. 9a) and data (FIG. 9b) to review it 903. Once the broker's review of the application is complete, FIGS. 1 and 19 show the "releases" that may occur according to the present invention, before the application is approved. The broker releases the application 130 using a pre-application release screen. A "release button" tells the control hub to electronically forward the application and data onto the General agent 130 and/or insurance company 131. A sample broker pre-application release screen is provided on FIG. 10.

As stated above, the system and method of the present invention advantageously avoid all of the common data entry mistakes made by brokers in the completion of an insurance application and alleviates the need for brokers to become familiar with each individual insurance company's forms. The method provides a single point of entry for the broker to conveniently ask a few brief questions from their client, complete a pre-application order form, and pass the responsibility to a third party service provider for completion. In an alternative embodiment, the broker passes the client personal information on to a third party via facsimile or other communication method, and the third party, a subscriber, completes the pre-application form. Either way, the ease of use and advantages presented by this system and method are needed in the industry.

The control hub 122 keeps the broker, general agent, insurance company, and any other subscribing parties, apprised of the status of each pre-application transaction in progress. Because applications are completed more accurately, the time delays that normally occur with a traditional people-paper intensive process are eliminated. As a result, the insurance industry can reduce underwriting costs and issue policies faster than ever before using this method.

Computer Subsystems

FIG. 1 refers to the overall architecture of the control hub 122. The control hub 122 is the total collection of computer software programs and hardware that together, perform the functions of the method. The control hub 122 is made up of three critical modules that perform specific operations or tasks that are instrumental to the process. These modules are Processing, Communications, and Memory.

The Processing Module comprises proprietary software programs that are responsible for retrieval, calculation and display of information contained in the Memory Module. All information is displayed on a subscriber's computer screen in a user friendly format. Examples of such displays utilized in the method are provided as FIGS. 2 through 7, and 9 through 10. The subscriber's computer screen is connected to the Internet. The Processing Module programs are comprised of the following:

a software program for data validation;
a software program for calculating insurance quotes;
a software program for dynamically creating and displaying the questions relating to the pre-application process;
a software program for communicating with third parties; and
a software program for managing the data collected the interview and the scanned application image.

The Communications Module is based on software that provides the ability for disparate computer software programs to exchange data bi-directionally. Communication may be established by and between any entity that has subscribed to the method and/or is participating in the pre-application transaction and the control hub. Referring to FIG. 1, for example, through the Communication Module of the control hub (not specifically illustrated), pre-application data is submitted to a service party, in this case a third party call center 140. Although not part of the present invention for illustration purposes only, the call center 140 works to fulfill the application by collecting applicant information, scheduling paramed exams, and retrieving signed insurance application. The call center 140 initiates communication with the control hub 122, through the Communication Module, to provide the status of the application and a digital image of the application. Still referring to FIG. 1, and part of the present invention, the control hub 122 permits and provides access to application information (a) for the broker for release of the application 130, (b) the insurance General agent for release of the application 131, and (c) the insurance company for approval and fulfillment of the application 132, 133. Fault tolerance and data validation processes are built into the communication interface to ensure predictable and reliable dialogs between all parties. Furthermore, the communication interface uses encryption technology to ensure and maintain the strictest privacy of client personal information.

The Memory Module stores data, software programs, and information entered by a subscriber. The Memory Module contains data such as:

information used in the calculation of insurance quotes;
a library of questions associated with insurance company application forms;
information related to the subscriber and his/her insurance practice;
information related to the insurance pre-application process; and
status information relating to the progress of the pre-application process.

The insurance quotes are displayed on the subscriber's computer screen 302 (see FIG. 13) after submission of the client's personal quote via a software program for communicating between the control hub and subscriber workstations through the Communications Module.

The Memory Module also stores various computer software programs including a data validation program, a program for calculating insurance quotes, a program for dynamically creating and displaying the questions relating to the pre-application process, a program for communicating with third parties and a program for managing the data collected the interview and the scanned application image.

In addition, the Memory Module stores the database management system (DBMS) that houses information about the entities participating in the insurance application process as well as information about the client interested in buying the insurance and information related to the clients who have previously applied for insurance. The DBMS includes tables for storing information about, for example:

the participating insurance companies and the insurance products that are available under the pre-application process;
the mortality costs and specifications related to the insurance products that are available under the pre-application process and are used to calculate an insurance quote;
the questions associated with insurance company application forms;
the participating service providers such as those that operate the call-center facilities associated with the interview process;
the subscribers who have contracted to use the method;
the clients who have chosen to apply for an insurance policy;
the status information relating to the progress of the pre-application process for each transaction;
the data which was collected during the client telephone interview;

and the scanned image of the signed application that is created by the call center.

The table of information about the subscribers preferably includes:
business mailing address information for the subscriber;
business phone numbers for the subscriber;
at least one scanned image of the subscribers signature;
insurance license numbers for the subscriber;
the subscriber's managing general agent(s); and
credit card information for the subscriber.

The table of information about the client preferably includes:
name, mailing address, phone numbers, occupation, data of birth, social security number, gender, height, weight, and drivers license number, and information concerning the insurance policy that the client has selected, including the life insurance company, the type of policy, the face amount of the policy, the amount of the annual payment, and any special information associated with the purchase of the insurance policy.

The table of information associated with insurance company application forms preferably includes:
the insurance company name, the insurance company form number, the file name for the form, a description of the form, the state in which the form is authorized to be used, the questions from the form, a code to determine if the question is related to policy replacement, and a code to determine if the question is related to the agent report portion of the form.

The table of information associated with the pre-application transaction status preferably includes the date each status entry was created, the transaction description and notes associated with each particular transaction.

Other information may be stored in the DBMS during the course of the pre-application process and the administration of the process. Additionally there may be information needed to provide customer support, and it would be readily apparent to those of skill in the art that such additional information, computer software, or database management would be necessarily included as part of the present invention.

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

We claim:

1. A computerized method for preparing insurance applications, comprising the steps of:
   entering preliminary information collected from an insurance applicant into a form displayed on a computer;
   identifying a plurality of insurance product options based on said preliminary information utilizing a computer database containing information regarding various offerings of insurance products;
   displaying said plurality of insurance product options and a premium for each option on said computer;
   receiving a selection of one of said displayed options;
   merging said preliminary information and said selected option to create an insurance company independent pre-application; and
   submitting said pre-application to a service provider for completion of a full insurance application by said service provider.

* * * * *